United States Patent
McVicar et al.

(10) Patent No.: US 9,586,798 B2
(45) Date of Patent: Mar. 7, 2017

(54) STEERING MECHANISM FOR AN ARTICULATED VEHICLE

(71) Applicant: Combilift, County Monaghan (IE)

(72) Inventors: Martin McVicar, County Monaghan (IE); Mark Whyte, County Monaghan (IE); Robert Moffett, County Monaghan (IE)

(73) Assignee: Combilift (IE)

( * ) Notice: Subject to any disclaimer, the term of this patent is extended or adjusted under 35 U.S.C. 154(b) by 0 days.

(21) Appl. No.: 14/898,184

(22) PCT Filed: Jun. 6, 2014

(86) PCT No.: PCT/EP2014/062546
§ 371 (c)(1),
(2) Date: Dec. 14, 2015

(87) PCT Pub. No.: WO2014/198959
PCT Pub. Date: Dec. 18, 2014

(65) Prior Publication Data
US 2016/0130124 A1   May 12, 2016

(30) Foreign Application Priority Data

Jun. 14, 2013 (GB) .................................. 1310692.8

(51) Int. Cl.
*B66F 9/10* (2006.01)
*E02F 9/08* (2006.01)
(Continued)

(52) U.S. Cl.
CPC .............. *B66F 9/105* (2013.01); *B62D 12/00* (2013.01); *B66F 9/07568* (2013.01); *E02F 9/0841* (2013.01)

(58) Field of Classification Search
CPC ......... B66F 9/105; B62D 12/00; E02F 9/0841
(Continued)

(56) References Cited

U.S. PATENT DOCUMENTS 2,362,262 A    11/1944 French
3,302,742 A    2/1967 Sunderlin
(Continued)

FOREIGN PATENT DOCUMENTS

WO    02/20333    3/2002

*Primary Examiner* — Tony Winner
(74) *Attorney, Agent, or Firm* — Whiteford, Taylor & Preston, LLP; Gregory M. Stone

(57) ABSTRACT

An articulated vehicle [10] has a first body section [12], a second body section [14], and an elongate projection [22] projecting from the first body section [12] towards the second body section [14]. A pair of steering cylinders [36, 34] are mounted such that they are partially or wholly disposed in or on the elongate projection [22], and are disposed one above the other so they overlap vertically, thereby narrowing the projection at the end nearer the first body section [12] and allowing the second body section [14] to be rotated closer to the centre line. A rotatable shaft [40] of the second body section [14] is mounted towards the far end of the elongate projection [22] and is steered by a pair of linkages such as chains [42, 44], each of which is connected to the shaft [40] and to a respective one of the steering cylinders [36, 34]. The chains [42, 44] wrap around the shaft [40] with a circumferential overlap, though they are spaced vertically. This circumferential overlap allows steering angles significantly in excess of 180° to be achieved.

9 Claims, 7 Drawing Sheets

(51) Int. Cl.
*B62D 12/00* (2006.01)
*B66F 9/075* (2006.01)

(58) Field of Classification Search
USPC .................................................. 180/235, 418
See application file for complete search history.

(56) References Cited

U.S. PATENT DOCUMENTS

| | | | | |
|---|---|---|---|---|
| 3,326,316 | A | | 6/1967 | Thassy |
| 4,290,622 | A | * | 9/1981 | Horvath ............... B62D 53/021 |
| | | | | 280/400 |
| 4,444,409 | A | * | 4/1984 | Garrison .............. B62D 53/021 |
| | | | | 180/235 |
| 5,253,727 | A | * | 10/1993 | Etherington ....... B62D 53/0871 |
| | | | | 180/418 |
| 5,485,893 | A | * | 1/1996 | Summers ............... B62K 21/12 |
| | | | | 180/219 |
| 8,863,882 | B2 | * | 10/2014 | Landoll .................... B62D 5/14 |
| | | | | 180/235 |
| 2008/0116000 | A1 | * | 5/2008 | Huang ................... B62D 6/002 |
| | | | | 180/418 |
| 2010/0284773 | A1 | * | 11/2010 | Brown ................ B62D 51/005 |
| | | | | 414/665 |

* cited by examiner

STEERING MECHANISM FOR AN ARTICULATED VEHICLE

This invention relates to steering mechanisms for articulated vehicles, and has particular application to load bearing vehicles such as forklift trucks.

BACKGROUND ART

Articulated vehicles such as forklift trucks used in narrow spaces benefit from being able to operate in the smallest width possible, and steering mechanisms should be designed to minimise the space required to manoeuvre.

An example of a steering mechanism is found in WO 02/20333, where a steering bogie at the front end of the truck carries the lifting forks and is coupled to the rear section of the truck by a vertical shaft which is rotatably mounted in a projection at the front of the chassis. A chain wrapped around the shaft can be pulled in either direction by a pair of steering cylinders disposed in the rear section of the truck, to steer the vehicle.

DISCLOSURE OF THE INVENTION

There is provided an articulated vehicle comprising:
a first body section;
a second body section;
an elongate projection projecting from an end of said first body section towards said second body section;
a pair of steering cylinders mounted such that they are partially or wholly disposed in or on said elongate projection;
a rotatable member provided towards the end of the elongate projection which is distal from the first body section, the rotatable member being operatively connected to the second body section such that rotation of the rotatable member causes the steering angle between the first and second body sections to vary, and such that the first and second body sections articulate relative to one another about said distal end of the elongate projection; and
at least one linkage connecting the rotatable member to the steering cylinders, such that actuation of a steering cylinder causes the linkage to force the rotatable member to rotate;
wherein the pair of steering cylinders are disposed one above the other such that they overlap vertically.

The vehicle of the invention provides a more compact and manoeuvrable steering arrangement, due to the disposition of the steering cylinders one above the other in or on the elongate projection. Because of this arrangement, the projection can be made very narrow—not much wider than the steering cylinders themselves—and this allows the bogie or second body section to be tucked tightly in towards the centreline of the truck when steered left or right.

Preferably, the steering cylinders are disposed towards the end of the elongate projection which is proximal to the first body section.

Preferably, the external width of the elongate projection tapers from a wider width at the distal end towards a narrower width where the cylinders are disposed one above the other.

The advantage of this arrangement is that having a narrower section behind the distal end of the elongate projection accommodates the second body section better when in the extreme steering positions. The advantage of this projection being wider at the distal end, where the rotatable member is mounted, is that the torque available to steer the truck is greater with a larger diameter rotatable member.

Preferably, the at least one linkage comprises a first linkage connecting a first of the pair of steering cylinders to the rotatable member, and a separate second linkage connecting the second of the pair of steering cylinders to the rotatable member.

Further, preferably, the first and second linkages are each connected to the rotatable member at a respective mounting such that the linkages extend from the respective cylinder to the respective mounting, wrapping around the rotatable member in opposite directions with a circumferential overlap between them.

This has the advantage that the rotatable member can be pulled by either of the linkages through more than 90 degrees, allowing the truck to be steerable through significantly more than 180 degrees, e.g. 210 degrees or more.

Preferably, the first and second linkages are spaced vertically on the rotatable member. By spacing the linkages vertically, they do not interfere with one another or overlap, and furthermore, the force exerted is entirely tangential to the rotatable member, and does not have a vertical force component.

Preferably, the rotatable member is a shaft carried on a bearing, the shaft being vertically disposed and extending through said distal end of said elongate projection.

Preferably, the or each linkage is wrapped partially around the circumference of the shaft and is fastened to the shaft.

Preferably, the steering cylinders are disposed at an angle to one another, each cylinder being aligned tangentially to opposite sides of a circumference of the rotatable member.

Preferably, the steering cylinders are selected from hydraulic cylinders and linear actuators. Most preferably, they are hydraulic cylinders. The invention is applicable to any driving mechanism which can be used to pull a linkage, if that driving mechanism has an elongated, narrow shape, like a hydraulic cylinder or linear actuator.

BRIEF DESCRIPTION OF THE DRAWINGS

The invention will now be further illustrated by the following description of embodiments thereof, given by way of example only with reference to the accompanying drawings, in which.

DETAILED DESCRIPTION OF PREFERRED EMBODIMENTS

Figure 1:
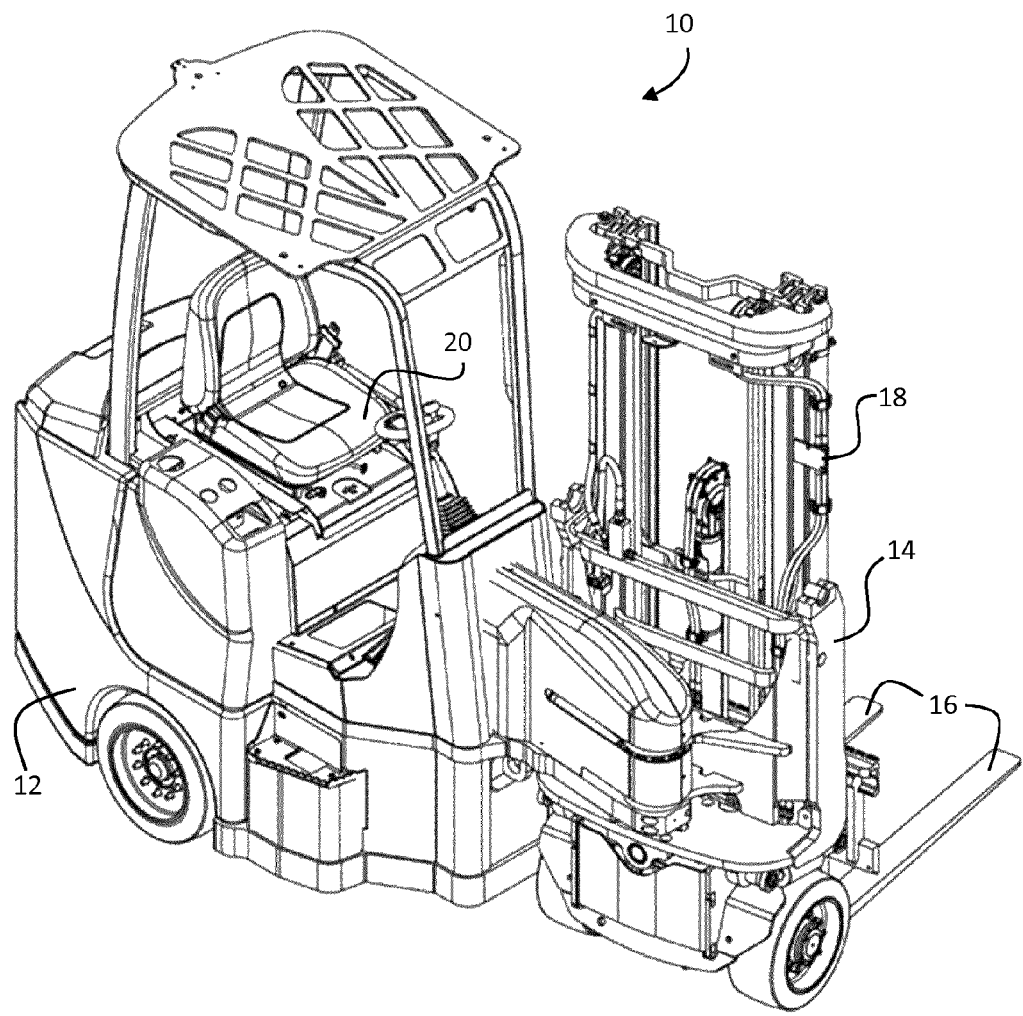
FIG. 1 is a perspective view of a vehicle according to the invention.

In FIG. 1, indicated generally at 10, there is shown a forklift truck having a rear body section 12 and a front body section 14. Forks 16 are carried on a mast 18 on the front section, while a driver's cab 20 is located in the rear section.

Figure 2:
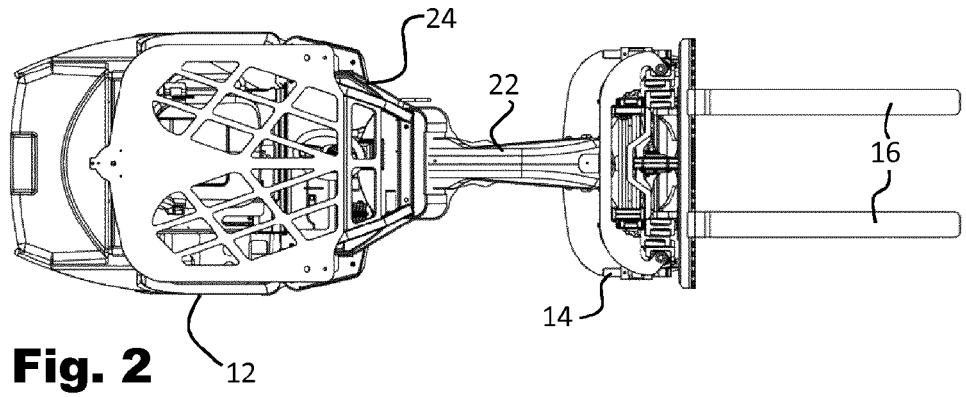
FIGS. 2-4 are plan views of the vehicle in different steering positions.
Figure 3:
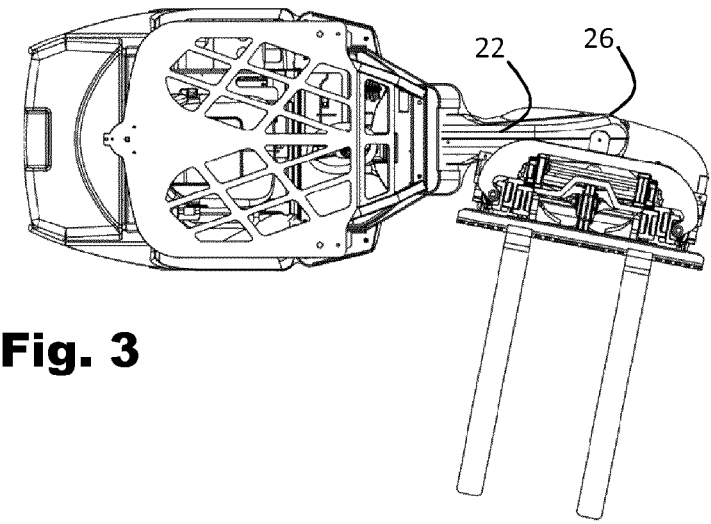
Figure 4:
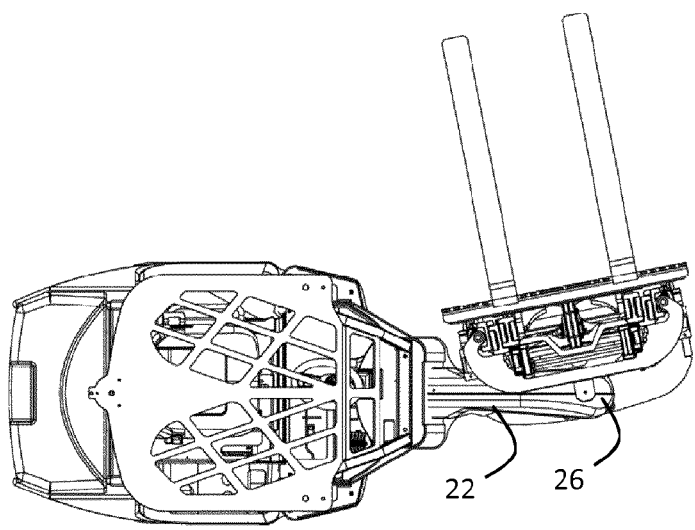

Referring to FIGS. 2-4, an elongate projection 22 extends from the front end 24 of the rear body section, with the front body section being pivotally steerable about the distal end 26 of the elongate projection 22 (see FIGS. 3 and 4). In FIG. 2, the vehicle is being steered in the straight-ahead direction, whereas in FIG. 3 it is being steered to the right and in FIG. 4 to the left.

Figure 5:
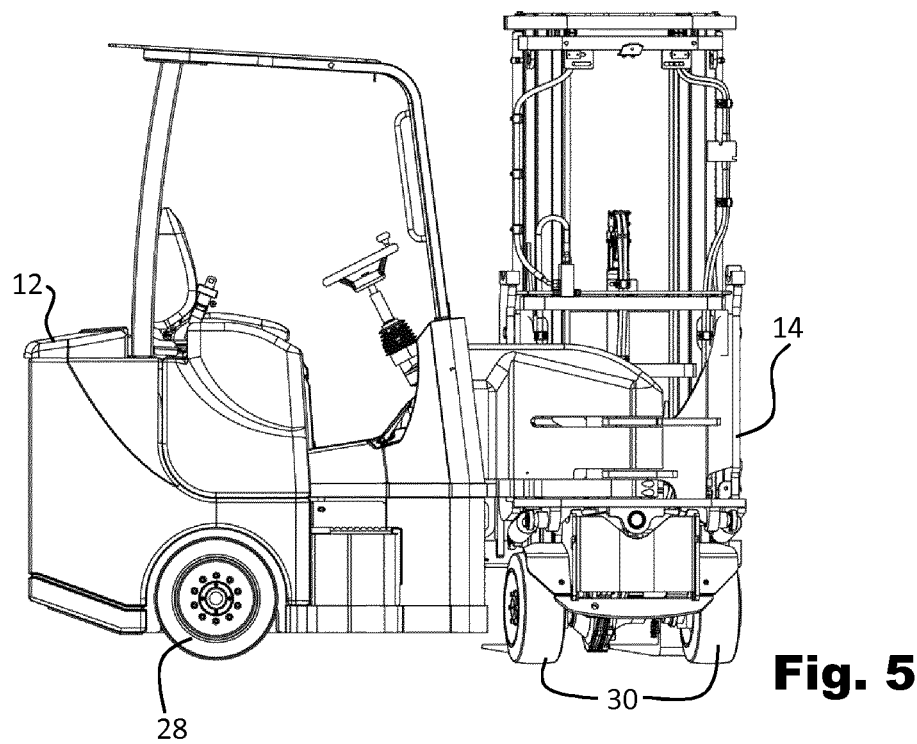
FIG. 5 is a side elevation thereof.
Figure 6:
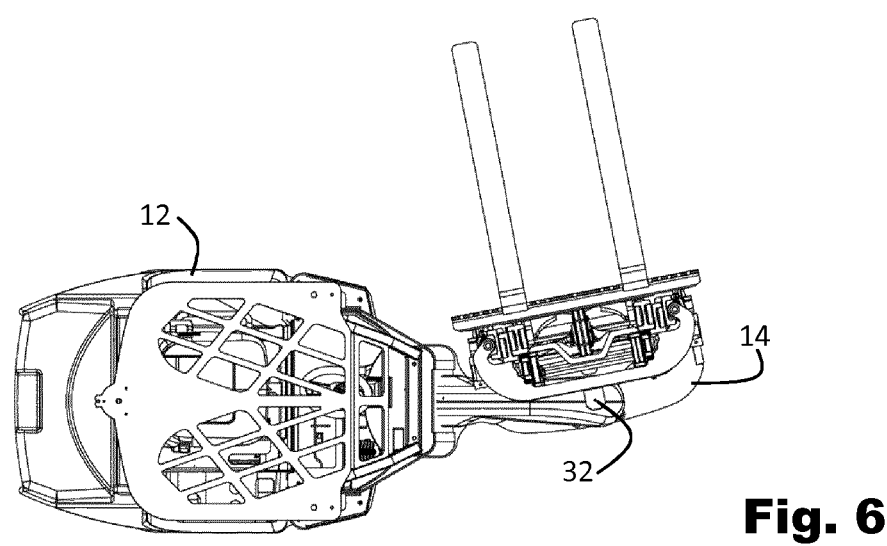
FIG. 6 is a top plan view thereof.

FIGS. 5 and 6 are side elevation and top plan views, respectively, of the vehicle 10 when being steered to the left. As can be seen in FIG. 5, the rear section 12 of the vehicle has a pair of rear wheels 28 (one of which is visible), which are not steerable. Steering is accomplished by rotating the entire front body section 14, which forms a steering bogie supported on a pair of front wheels 30, about a vertical pivoting axis 32, indicated in the plan view of FIG. 6. A single front wheel could equally be used.

Figure 7:
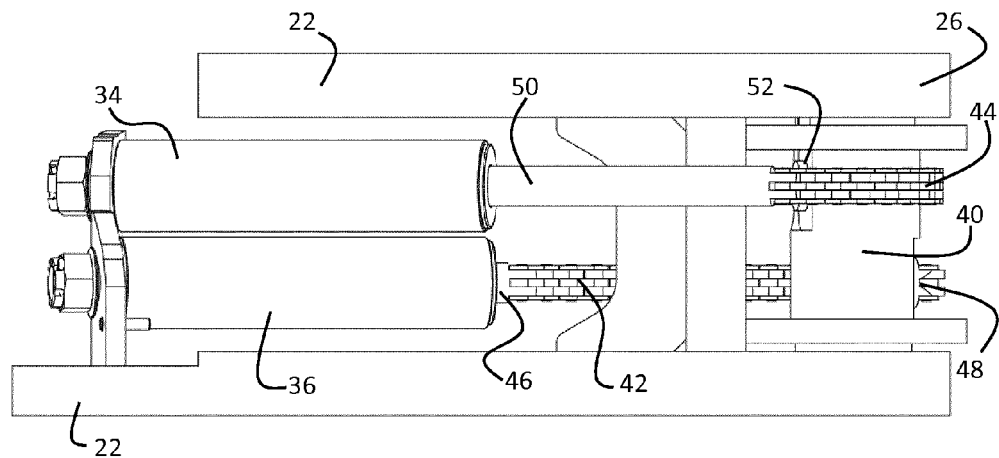
FIG. 7 is a side elevation of the steering arrangement of the vehicle of FIG. 1
Figure 8:
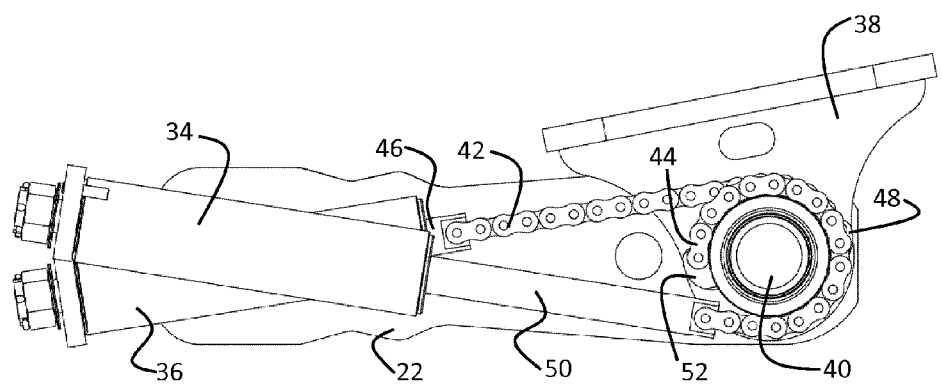
FIG. 8 is a top plan view of the steering arrangement.

FIGS. 7 and 8 show the steering mechanism in side elevation and in top plan view, respectively. A first steering cylinder 34 is mounted above a second cylinder 36 such that, when viewed from above (FIG. 8), they overlap in the vertical direction. The steering cylinders 34,36 are mounted at the rear proximal end) of the elongate projection 22. Alternatively they can be mounted to the rear body section of the vehicle to extend into the elongate projection 22.

A small portion 38 of the front body section of the truck can be seen in FIG. 8, noting that the truck is being steered fully to the left. Steering is accomplished by rotating a rotatable shaft 40 which is mounted in a bearing (not shown) and which extends vertically through the elongate projection 22 at its distal end 26, and this rotation is effected by a pair of linkages or chains 42,44. Chain 42 connects a piston rod 46 of a hydraulic piston (not visible) mounted in lower steering cylinder 36 to a mounting point 48 on the shaft 40. Chain 44 similarly connects a piston rod 50 of a hydraulic piston (not visible) mounted in the upper steering cylinder 34 to a mounting point 52 on the bearing 40. It will be seen that the chains, piston rods and mounting points are separated vertically from one another so that they do not interfere with one another.

As shown in FIGS. 7 and 8, the truck is steered fully to the left. The lower piston rod 46 and the lower steering cylinder 36 is fully retracted and this has caused the upper piston rod 50 in the upper steering cylinder 34 to be fully extended, with the upper chain 44 wrapped completely around the shaft 40.

To steer the truck to the straight-ahead position, piston rod 50 would be hydraulically retracted halfway into cylinder 34, drawing piston rod 46 halfway out of cylinder 36 and rotating the bearing by about 95 degrees clockwise. Continued retraction of piston rod 50 causes the chain 44 to pull the mounting point 52 further clockwise, until piston rod 50 is fully retracted, piston rod 46 fully extended, and the truck is steered fully right.

Figure 9:
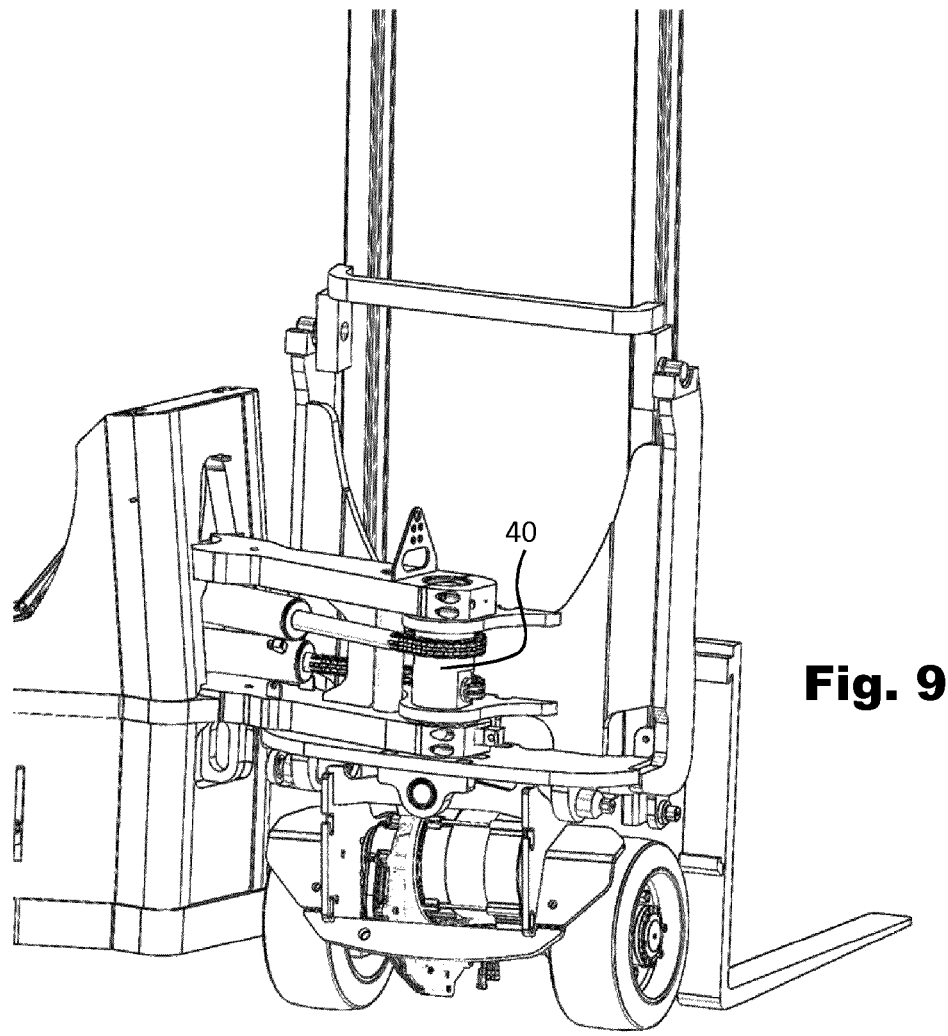
FIG. 9 is a cutaway perspective view of the vehicle revealing the steering mechanism in situ.
Figure 10:
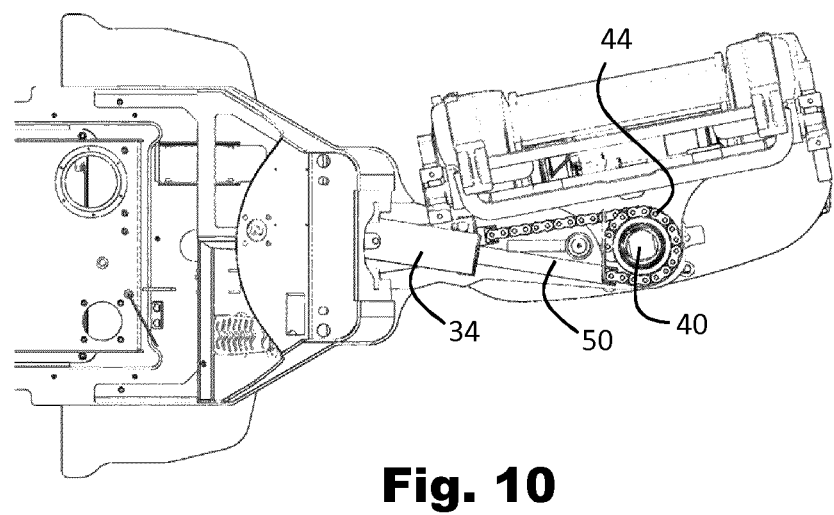
FIG. 10 is a cutaway top plan view of the vehicle revealing the steering mechanism in situ.

FIGS. 9 and 10 show the mechanism in situ in the truck, first in a perspective view (FIG. 9) and then in a plan view (FIG. 10) both cut away to show the mechanism. In FIG. 9, shaft 40 is indicated, while in FIG. 10 the upper steering cylinder 34, its piston rod 50 and chain 44 are also indicated.

Figure 11:
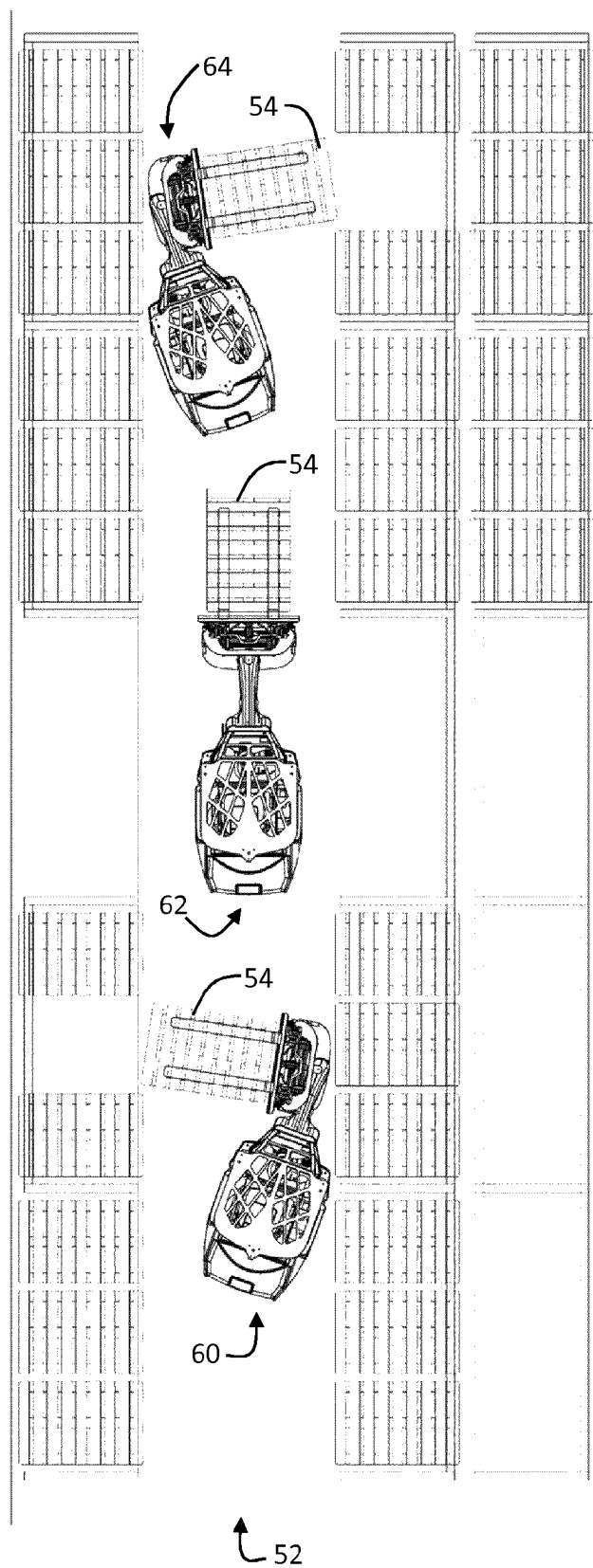
FIG. 11 is a diagram showing the vehicle in different steering positions in use.

FIG. 11 shows the forklift truck 10 in operation within a narrow aisle 52 manoeuvring pallets 54.

The truck is shown in three positions, steered to the left at position 60, steered straight ahead at position 62 and steered to the right at position 64. It will be appreciated that because of the arrangement of the steering cylinders one above the other, the elongate projection 22 can be made very narrow and thus the front end can be steered left or right to a more extreme angle than with conventional forklift trucks.

Figure 12:
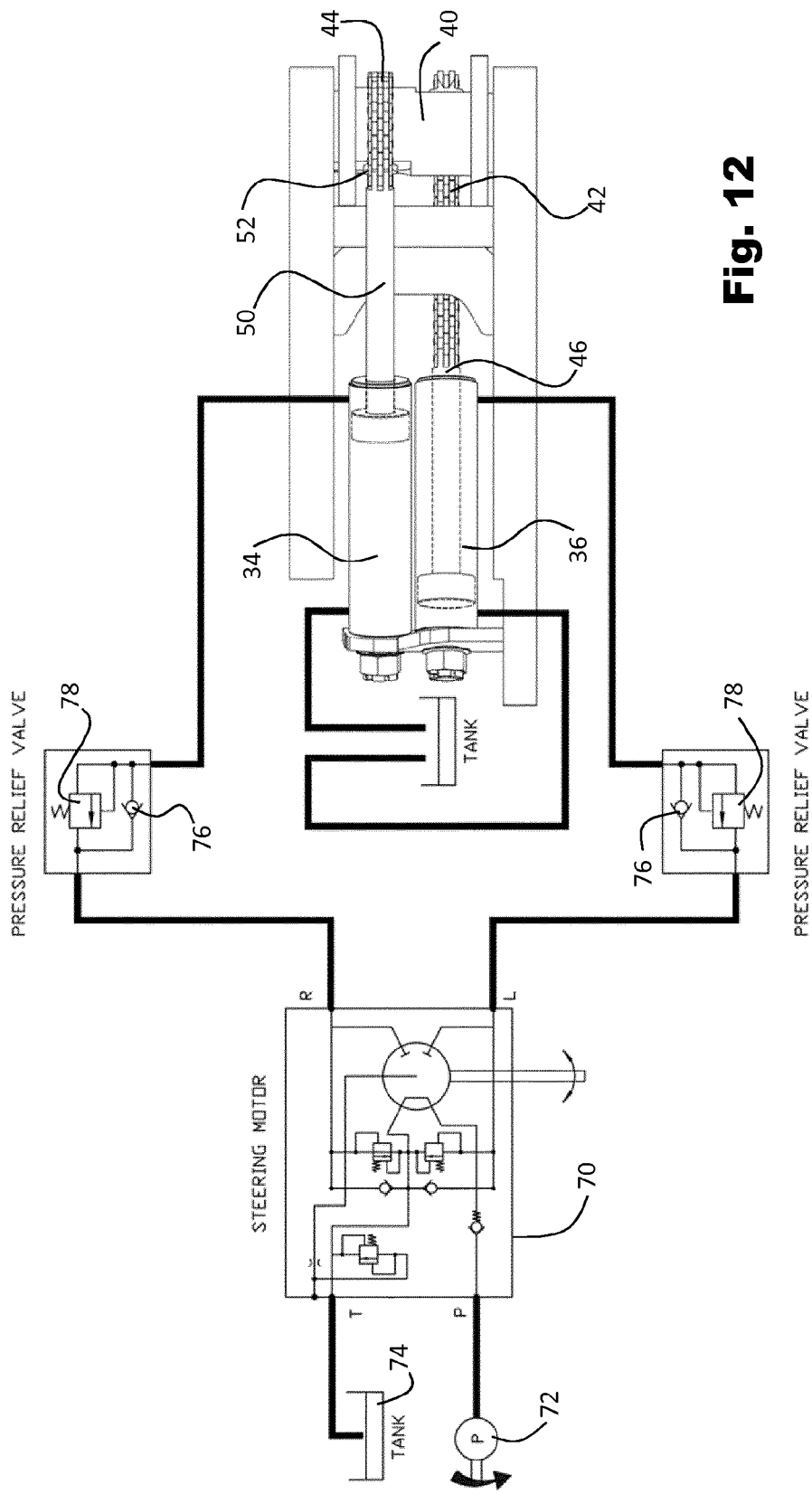
FIG. 12 is a hydraulic circuit diagram.

FIG. 12 shows a hydraulic circuit used in steering the vehicle. A steering motor in the form of a conventional steering orbital unit 70 has four ports P, T, R and L. Ports R and L are connected to the piston rod side of the hydraulic cylinders 34 and 36 respectively, port P is connected to a source 72 of hydraulic oil under pressure, and port T to a tank 74. A respective non-return valve 76 is connected in series in each hydraulic line connecting the unit 70 to the cylinders 34 and 36, and a respective. pressure relief valve 78 is connected in parallel with each valve 76. The unit 70 is rotatable such that port P may be connected selectively to cylinder 34 via port R, or to cylinder 36 via port L, or to neither cylinder. When the port P is connected to one of the ports R or L, the other port L or R is connected to port T.

Starting from the straight ahead position when the port P is connected to port R, oil under pressure is forced into the piston rod side of the cylinder 34 via the respective non-return valve 76.

This retracts the piston rod 50 and thereby pulls the chain 44 away from the shaft 40. Due to the attachment of the chain 44 to the shaft at 52, this movement of the chain rotates the shaft 40, and hence the second body section of the truck, in a clockwise direction to steer the forklift truck to the right.

In a similar manner, when the port P is connected to cylinder 36, oil under pressure is forced into the cylinder 36 via the respective non-return valve 76 to retract the piston rod 46 and thereby rotate the shaft 40 in an anticlockwise direction to steer the forklift truck to the left.

In each case, in order to allow the piston rod 50 or 46 to retract when oil under pressure is supplied to the corresponding cylinder 34 or 36, it is necessary that oil be allowed to flow out of the other cylinder 36 or 34 respectively to allow the piston rod of that other cylinder to extend. This is because the total distance between the piston rods 46 and 50, as measured along the chains 42 and 44 and around the shaft 40, is fixed. This is achieved in each case by the pressure relief valves 78, which allow hydraulic oil to flow out of a cylinder to the tank 74 when the cylinder's port R or L is connected to port T and the pressure of the oil therein exceeds a certain threshold pressure set by the relief valve. This ensures that the chains 42 and 44 are kept under tension at all times, even if the chains should increase in length over time, and provides precise steering control.

The diameter of the shaft 40, the diameter of the hydraulic cylinders 34 and 36 and the displacement of the steering motor 70 govern the steering speed of the mechanism. Although the foregoing has used chains to couple the hydraulic cylinders to the shaft, it is possible to use any elongated substantially inelastic flexible linkage such as steel cable.

The advantages of the above embodiment are that steering is precise and controlled due to the absence of slack in the system, even where the components are subject to wear over time. Further, the steering speed is constant for all angles of the bogie 14 which allows the system to be used over a full steering range of approximately 210 degrees. Also, the steering motor 70 provides a hydraulic brake, so that no separate steering brake is necessary.

In summary, the articulated vehicle has a first body section, a second body section, and an elongate projection projecting from the first body section towards the second body section. A pair of steering cylinders are mounted such that they are partially or wholly disposed in or on the elongate projection, and are disposed one above the other so they overlap vertically, thereby narrowing the projection at the end nearer the first body section and allowing the second body section to be rotated closer to the centre line. A rotatable shaft of the second body section is mounted towards the far end of the elongate projection and is steered by a pair of linkages such as chains, each of which is connected to the shaft and to a respective one of the steering cylinders. The chains wrap around the shaft with a circumferential overlap, though they are spaced vertically. This circumferential overlap allows steering angles significantly in excess of 180 degrees (i.e. from the extreme left position to the extreme right position, compare FIGS. 3 and 4) to be achieved.

The invention is not limited to the embodiment(s) described herein but can be amended or modified without departing from the scope of the present invention.

The invention claimed is:

1. An articulated vehicle comprising:
   a first body section;
   a second body section;
   an elongate projection projecting from an end of said first body section towards said second body section;
   a pair of steering cylinders mounted such that they are partially or wholly disposed in or on said elongate projection;
   a rotatable member provided towards a distal end of the elongate projection which is distal from the first body section, the rotatable member being operatively connected to the second body section such that rotation of the rotatable member causes the steering angle between the first and second body sections to vary, and such that the first and second body sections articulate relative to one another about said distal end of the elongate projection; and
   at least one linkage connecting the rotatable member to the steering cylinders, such that actuation of a steering cylinder causes the linkage to force the rotatable member to rotate;
   wherein the pair of steering cylinders are disposed one above the other such that they overlap vertically.

2. An articulated vehicle as claimed in claim 1, wherein the steering cylinders are disposed towards a one end of the elongate projection which is proximal to the first body section.

3. An articulated vehicle as claimed in claim 1, wherein an external width of the elongate projection tapers from a wider width at the distal end towards a narrower width where the cylinders are disposed one above the other.

4. An articulated vehicle as claimed in claim 1, wherein the at least one linkage comprises a first linkage connecting a first of the pair of steering cylinders to the rotatable member, and a separate second linkage connecting a second of the pair of steering cylinders to the rotatable member.

5. An articulated vehicle as claimed in claim 4, wherein the first and second linkages are each connected to the rotatable member at a respective mounting such that the linkages extend from the respective cylinder to the respective mounting, wrapping around the rotatable member in opposite directions with a circumferential overlap between them.

6. An articulated vehicle as claimed in claim 5, wherein the first and second linkages are spaced vertically on the rotatable member.

7. An articulated vehicle as claimed in claim 1, wherein the rotatable member is a shaft carried on a bearing, the shaft being vertically disposed and extending through said distal end of said elongate projection.

8. An articulated vehicle as claimed in claim 7, wherein the at least one linkage is wrapped partially around the circumference of the shaft and is fastened to the shaft.

9. An articulated vehicle as claimed in claim 1, wherein the steering cylinders are disposed at an angle relative to one another, each cylinder being aligned tangentially to opposite sides of a circumference of the rotatable member.

* * * * *